United States Patent [19]

Viertel et al.

[11] Patent Number: 5,466,405
[45] Date of Patent: Nov. 14, 1995

[54] METHOD FOR THE MANUFACTURE OF A SUN VISOR

[75] Inventors: Lothar Viertel, Altiorweiler, Germany; Patrick Welter, La chambre, France; René Lercorvaisier, Hombourg-Houts; Serge Mosser, Bambiderstroff, France; Karl-Heinz Pompino, Wuppertal, Germany

[73] Assignee: Gerb. Happich GmbH, Germany

[21] Appl. No.: 115,909

[22] Filed: Sep. 1, 1993

Related U.S. Application Data

[62] Division of Ser. No. 25,884, Mar. 3, 1993, Pat. No. 5,308, 137.

[30] Foreign Application Priority Data

Dec. 18, 1992 [DE] Germany .......................... 42 42 939.0

[51] Int. Cl.⁶ .............................. B29C 43/04; B29C 44/44
[52] U.S. Cl. .................. 264/45.4; 264/45.5; 264/126; 264/293; 264/296; 264/321
[58] Field of Search .................... 264/45.4, 321, 264/126, 296, 55, 293, 45.5

[56] References Cited

U.S. PATENT DOCUMENTS

| | | |
|---|---|---|
| 4,304,810 | 12/1981 | Gates et al. . |
| 4,538,787 | 9/1985 | Fox et al. ............................. 264/45.5 |
| 4,570,990 | 2/1986 | Flowerday ........................... 296/97.1 |
| 4,584,230 | 4/1986 | Saegusa . |
| 4,610,477 | 9/1986 | Ebert et al. .......................... 264/46.7 |
| 4,664,435 | 5/1987 | Dietz et al. . |
| 4,698,252 | 10/1987 | Koch et al. ........................... 264/321 |
| 4,763,946 | 8/1988 | Robbins et al. . |
| 4,867,500 | 9/1989 | Oosterbaan et al. ................. 296/97.1 |
| 5,221,120 | 6/1993 | Viertel et al. ........................ 296/97.1 |
| 5,252,270 | 10/1993 | Haardt et al. ......................... 264/45.4 |

FOREIGN PATENT DOCUMENTS

| | | | |
|---|---|---|---|
| 0317995 | 5/1989 | European Pat. Off. ............. 264/45.4 |
| 0530740 | 9/1992 | European Pat. Off. . |
| 58-171946 | 10/1983 | Japan ................................... 264/45.4 |
| 58-215329 | 12/1983 | Japan ..................................... 264/296 |
| 60-042434 | 3/1985 | Japan ................................... 264/45.4 |
| 60-082333 | 5/1985 | Japan ................................... 264/45.4 |

OTHER PUBLICATIONS

European Search Report dated Mar. 30, 1994.

*Primary Examiner*—Allan R. Kuhns
*Attorney, Agent, or Firm*—Ostrolenk, Faber, Gerb & Soffen

[57] ABSTRACT

A sun visor having a sun-visor body with a stiffening at or close to the edge of the sun-visor body. The sun visor body and stiffening being comprised of polypropylene particle foam, the stiffening being substantially harder and stiffer than the remaining regions of the sun-visor body. A method and an apparatus for the manufacture thereof are also disclosed.

6 Claims, 7 Drawing Sheets

METHOD FOR THE MANUFACTURE OF A SUN VISOR

This is a division of application Ser. No. 08/025,884, filed Mar. 3, 1993, now U.S. Pat. No. 5,308,137.

CROSS-REFERENCE TO RELATED APPLICATION

This application is related to commonly-assigned U.S. patent application Ser. No. 08/025,886, filed Mar. 3, 1993, of Wolfgang Heidecke et al. for "METHOD OF PRODUCING A STRUCTURED SURFACE ON PLASTIC FOAM MOLDING MADE OF EXPANDED POLYPROPYLENE PARTICLES", now abandoned, which was filed on the same date as the parent of the present application. The disclosures of the related application are expressly incorporated by reference herein.

BACKGROUND OF THE INVENTION

1. Field of the Invention

The present invention relates to a sun visor for motor vehicles having a sun-visor body of plastic foam and at least one stiffening in the sun-visor body for providing support to the sun-visor body. The invention also relates to a method of manufacturing the sun visor and to an apparatus for carrying out the method.

2. Description of the Related Art

Sun visors for motor vehicles are known in a large number of embodiments. All known sun visors have a multipartite construction and, furthermore, the feature in common that they are assembled from parts made of different materials. The sun-visor bodies frequently consist of a stiffening formed of steel wire, pressboard, PVC moldings, or a combination of these parts; of cushionings of plastic foam; of bearing brackets of PVC; and of coverings which are formed of PVC, of textile material, of leather, or the like.

The traditional construction of sun visors is relatively cumbersome and expensive. Moreover, it is difficult or even frequently impossible to break down the sun visors into their individual parts upon the scrapping of the vehicle in order to use the individual parts again. Another disadvantage of the known sun visors is that they are too heavy.

SUMMARY OF THE INVENTION

An object of the present invention is to provide an improved sun visor that can be manufactured more easily and at less expense than traditional sun visors. The sun visor comprises substantially fewer individual parts, is of only slight weight but nevertheless has a stability which is entirely sufficient for the technical requirements, and can be recycled in a particularly simple manner. A further object of the invention is to provide a method of manufacturing such a sun visor, as well as an apparatus for carrying out the method.

These and other objects are achieved by a sun visor having a sun-visor body that is relatively flat, approximately rectangular in shape. The sun-visor body is developed as one piece with at least one surrounding stiffening at or close to the sun-visor body; the stiffening extending at or at a slight distance from and parallel to the circumferential edge thereof. The sun-visor body and the stiffening may both be made of polypropylene particle foam. However, the stiffening differs from the material of the sun-visor body by having substantially greater hardness and stiffness.

Particular advantages of the method of the invention are that separate manufacture and arrangement of traditional stiffening systems is dispensed with, and the stiffening is made an integral part of the sun-visor body. This results in the production of fewer parts, less management of parts, a cost saving, a reduction in weight, and fewer quality problems.

In accordance with a first embodiment, the stiffening extends over a corner region of the sun-visor body within which there is formed a hole for receiving a shaft for mounting the sun visor. This feature serves to dispense with mounting housings which were previously necessary.

In accordance with another feature of the invention, two surrounding stiffenings of frame shape can be provided which extend from the flat sides of the sun-visor body towards each other in the inside of the body. In accordance with another embodiment, the stiffening is located within the sun-visor body and is covered on the outside by polypropylene particle foam which corresponds to the rest of the material of the sun-visor body.

The sun-visor body can advantageously comprise two halves which abut in the central plane of the sun-visor body; at least one of the halves being developed with a stiffening. The halves can be bonded or welded to each other, or else additionally interlocked with each other by means of protruding beads on one half which engage recessed grooves in the other half. It is advisable for the projecting beads to have a substantially greater hardness and stiffness than the remaining material of the sun-visor body, thus performing the stiffening function. Assembly of the sun visor is simplified by connecting the two halves of the sun-visor body by a film hinge.

Another embodiment of the invention provides that at least one of the two halves of the sun-visor body has a stiffening which extends over the entire surface thereof.

A further feature of the invention provides that the sun-visor body has a depression in one of its main surfaces. The depression is stiffened over its entire surface, or at least on its circumferential edge, and serves to receive a frame which bears a mirror. The mirror frame includes pins with undercut annular beads which are pressed into blind holes in the body of the sun visor to install the mirror frame in the depression.

The body of the sun visor can furthermore have an open-edge recess at the end region facing away from the shaft for mounting the sun visor. The recess receives a clamp which bears an outer-support pin, the clamp being attached to the sun visor by anchoring pins engaging openings in the body of the sun visor.

It is of particular importance that the stiffening or stiffenings be formed by a permanent deformation of at least partial regions of the material of the sun-visor body which are pressed together.

The sun-visor body is preferably provided with a covering formed of polypropylene material. A further feature of the invention provides that the covering is formed directly on the sun-visor body by changing its surface structure. It has proven particularly advantageous for the covering to be formed by softening the surface of the sun-visor body and introducing an embossed structure into the softened surface of the sun-visor body.

A further development of the invention provides that the sun-visor body is provided at its front end region with notches which pass continuously from the upper edge to the lower edge. The notches extend along both main surfaces of the sun-visor body. This feature is easy to carry out due to the material selected for the sun-visor body; it does away with any danger of breakage by fatigue of the material and permits adaption of the contour of the sun-visor body in the region of the A column of the body of the vehicle, in the same way on the left side and the right side of the vehicle.

For the manufacture of the sun visor a method is employed in which a sun-visor body is first produced by introducing a filling of polypropylene particles into a mold cavity of a mold and heating the particles by the introduction of steam or hot air into the mold so that the particles soften, expand, and are welded together. The sun-visor body obtained in this manner is subjected by the action of pressure perpendicular to its central plane to a compressing of the material and thus to the formation of at least one stiffening. The sun-visor body is finally provided with a covering.

It is possible to produce a sun-visor body having a stiffening in a single piece and of the same material as the sun-visor body. The sun-visor body is subjected in the region of the stiffening to the action of pressure which effects a targeted compacting of the structure.

The method of the invention can advantageously comprise a first step in which a sun-visor body is formed having surfaces, ribs, beads or the like protruding from the sun-visor body on at least one of its main surfaces. As the next step, only the surfaces, ribs, beads or the like protruding from the plane of the sun-visor body are subjected to the pressure action, which is maintained until the protruding regions are forced back into the plane of the sun-visor body thereby forming a stiffening.

In another embodiment of the method, in the first step a sun-visor body having two halves which are connected by a film hinge to each other is formed. One half of the sun-visor body is developed with at least one bead and the other half with at least one groove. In the next step, only the bead is subjected to the pressure so as to reduce the height thereof with the formation of a stiffening. After cooling, the sun-visor body is removed from the mold and the bead is introduced into the groove by swinging the sun visor halves together. These features have the advantage that the stiffening of the sun-visor body cannot be felt from outside the sun-visor.

After at least partial regions of the sun-visor body which are intended for a stiffening are pressed together, the particles of the polypropylene material cannot relax again or expand. The expansion or relaxation of the material is prevented, in accordance with a further feature of the invention, by applying pressure and heat on the sun-visor body to compress the material of the sun-visor body.

When the material of the sun-visor body is compressed, by applying pressure on the sun-visor body from the outside towards the inside of the sun-visor body, it is advisable to fill the indentations or cavities formed on the surface of the sun-visor body in each case again with polypropylene particles and to foam them.

A preferred further development of the method of the invention provides that the sun-visor body is subjected to further working in order to provide it with a covering by plasticizing and embossing the surface layer thereof. In this way, a conversion under heat and pressure of the foam particle structure in the region of the surface of the sun visor is obtained. The conversion of the foam particle structure takes place into a compact closed surface and ensures that no polypropylene particles can be seen any longer on the structured surface.

The apparatus intended for carrying out the method comprises a mold formed of two halves with a mold cavity between the halves and at least one pressure ram which is associated with the mold. The pressure ram is arranged to be in communication with the mold cavity so as, by its displacement, to reduce the cross section of the opening of the mold cavity and the cross section of the sun-visor body which is formed in the mold cavity. Since the particle structure of the sun-visor body is to be changed or compacted only in the region of the stiffening, it is advisable that the pressure ram include heating and cooling means.

For the production of a covering for the sun-visor body, it is particularly advantageous for the apparatus also to have a lower mold with a cavity which receives the sun-visor body up to approximately its longitudinal center plane. An embossing stamp is provided which can be moved against the lower mold and has a cavity which surrounds the regions of the sun-visor body protruding from the lower mold. The wall surfaces of the embossing-stamp cavity which come into contact with the sun-visor body are structured. The embossing stamp has means for heating and plasticizing the surface of the sun-visor body adjacent to it.

A further development may include the lower mold being developed as an embossing stamp with a structured cavity wall and means for heating and plasticizing the surface of the sun-visor body adjacent to it.

Other features and advantages of the present invention will become apparent from the following description of the invention which refers to the accompanying drawings.

DESCRIPTION OF THE PREFERRED EMBODIMENTS

Figure 1:
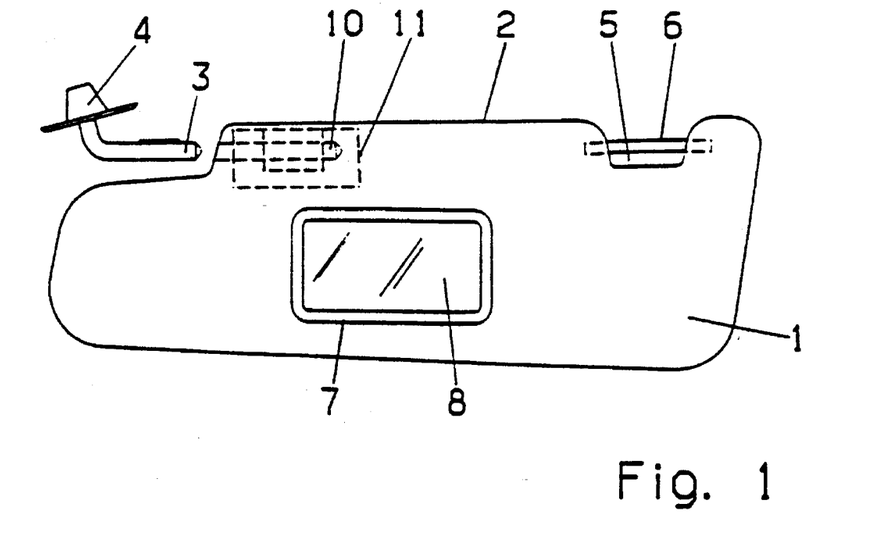
FIG. 1 is a plan view of a sun visor.

The sun visor of FIG. 1 comprises a sun-visor body 1. The upper longitudinal edge 2 of the sun-visor body 1 retains a sun-visor shaft 3. The sun-visor shaft 3 is mounted at its other end in a bearing bracket 4, which can be fastened to the body of a vehicle (not shown). On the opposite side, the sun-visor body 1 has an outer support pin 6 which passes across a recess 5 and can be engaged detachably in an outer support bracket (not shown). The sun-visor body 1 bears on one flat side a mirror 8 mounted in a mirror frame 7.

Figure 1A:
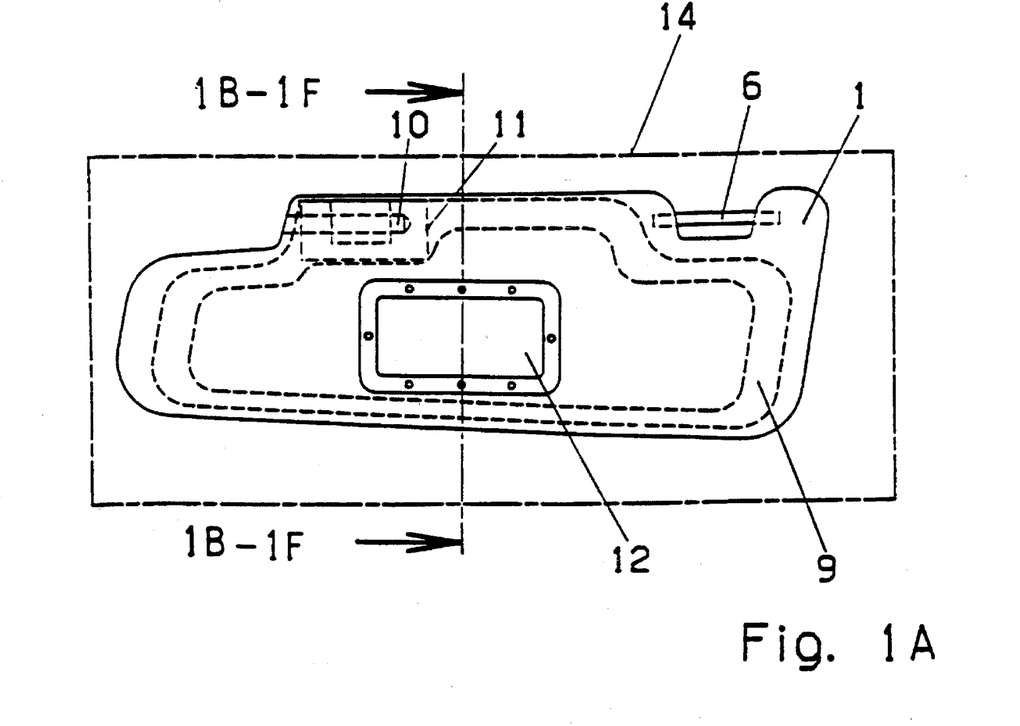
FIG. 1A shows the sun visor of FIG. 1 in one manufacturing stage.

The sun-visor body 1 may be formed in one piece with a stiffening 9 (shown in FIG. 1A), and be comprised, like the stiffening 9, of polypropylene particle foam. Referring to FIG. 1A, the stiffening 9 is formed in the shape of a frame and extends circumferentially close to the edge of the sun-visor body 1. The stiffening 9 may also extend over a corner region of the sun-visor body 1 to form a mounting recess 11 provided with a hole 10 for receiving the sun-visor shaft 3.

A second stiffening 9 of the sun-visor body 1 is provided in a stepped-down recess 12 which serves to receive the mirror 8 with mirror frame 7. In an upper step to the recess 12, insertion openings are provided for anchoring pins 13 arranged on the mirror frame 7 (shown in FIG. 4A).

In FIG. 1A, which shows the sun-visor body 1 of FIG. 1, the stiffening region 9 is indicated by the dashed lines. The stiffening 9 can also be supplemented by diagonally, longitudinally and/or transversely extending zones if the stiffening shown should prove to be insufficiently stable as, for instance, in the case of particularly large sun visors. FIG. 1A shows in a dash-dot line an optional cover blank 14 for a separate covering to the sun-visor body 1 which may be desired.

Figure 1B:
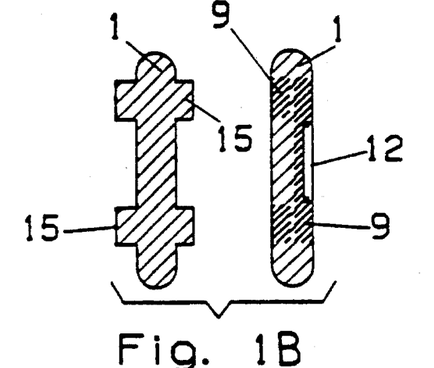
FIGS. 1B to 1F each show sections corresponding to the section line 1B–1F in FIG. 2, showing, in each case, two stages of manufacture.

FIGS. 1B to 1F show in cross section examples of the construction of the sun-visor body 1. In FIG. 1B, a sun-visor body 1 without stiffening is shown on the left and a sun-visor body 1 with stiffening 9 is shown on the right. The sun-visor body 1 is manufactured with ribs 15 protruding on both sides from the plane of the sun-visor body 1. The ribs are forced by the application of heat and pressure into the plane of the sun-visor body 1. The fine hatching in FIG. 1B shows the stiffening 9, which is present also in the region of the recess 12. The fine hatched zones, which form the stiffening 9 of the sun-visor body 1, differ from the rest of the material of the sun-visor body 1 by having substantially greater density, hardness and stiffness.

Figure 1C:
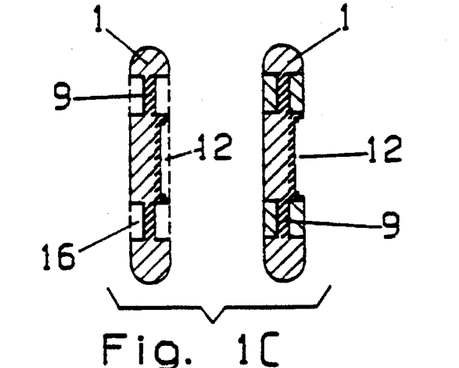

In FIG. 1C, the initial shape of the sun-visor body 1 is shown in dashed line. By grooves 16, introduced from the broad sides of the sun-visor body 1, a circumferential stiffening 9 is produced by compacting the material of the sun-visor body. The grooves 16 are subsequently filled with polypropylene particles and foamed. The use of material of different color is also conceivable.

Figure 1D:
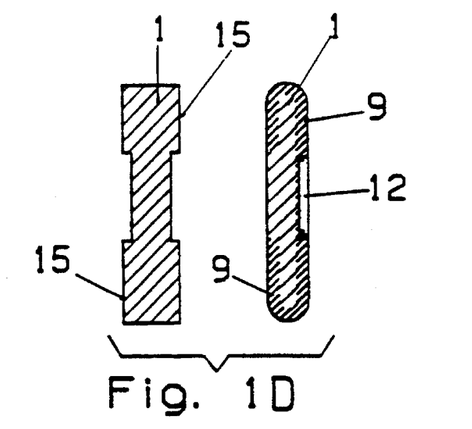

FIG. 1D shows on the left side an I-shaped starting body, the upper and lower ribs 15 of which protrude from the plane of the sun-visor body 1. The ribs 15 are forced into the plane of the sun-visor body 1, to form a stiffening 9, by using heat and pressure as in all the other embodiments described herein.

Figure 1E:
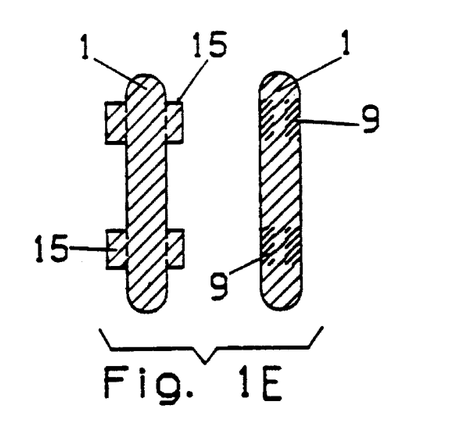
Figure 1F:
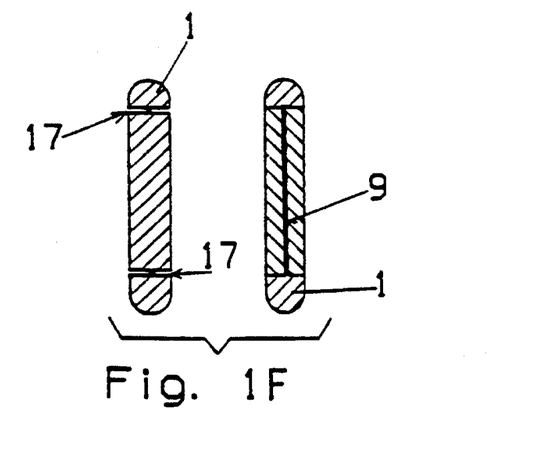

The embodiment shown in FIG. 1E differs from the embodiment shown in FIG. 1B in the manner that the ribs 15 of the sun-visor body 1 are formed. The ribs 15 in FIG. 1E are interrupted as shown by the dashed lines.

FIG. 1E shows a sun-visor body 1 with a circumferential slit 17 formed on both sides. The region between the slits 17 is compressed on both sides with the formation of a plate-shaped stiffening 9. The indentations or cavities formed on both sides are subsequently filled with polypropylene particles and foamed, as already explained with reference to FIG. 1C. As a result, there are no hard transition zones on the surface of the sun-visor body 1.

Figure 2:
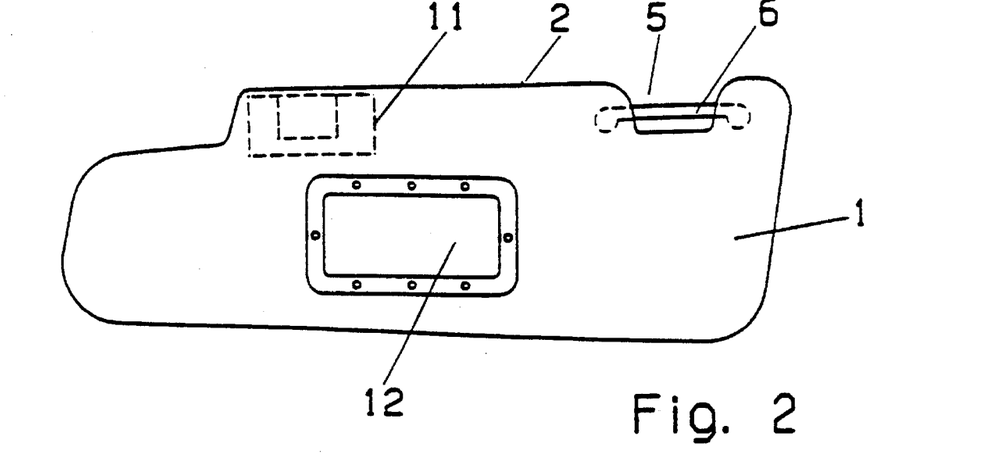
FIG. 2 is a plan view of a second sun visor.
Figure 2A:
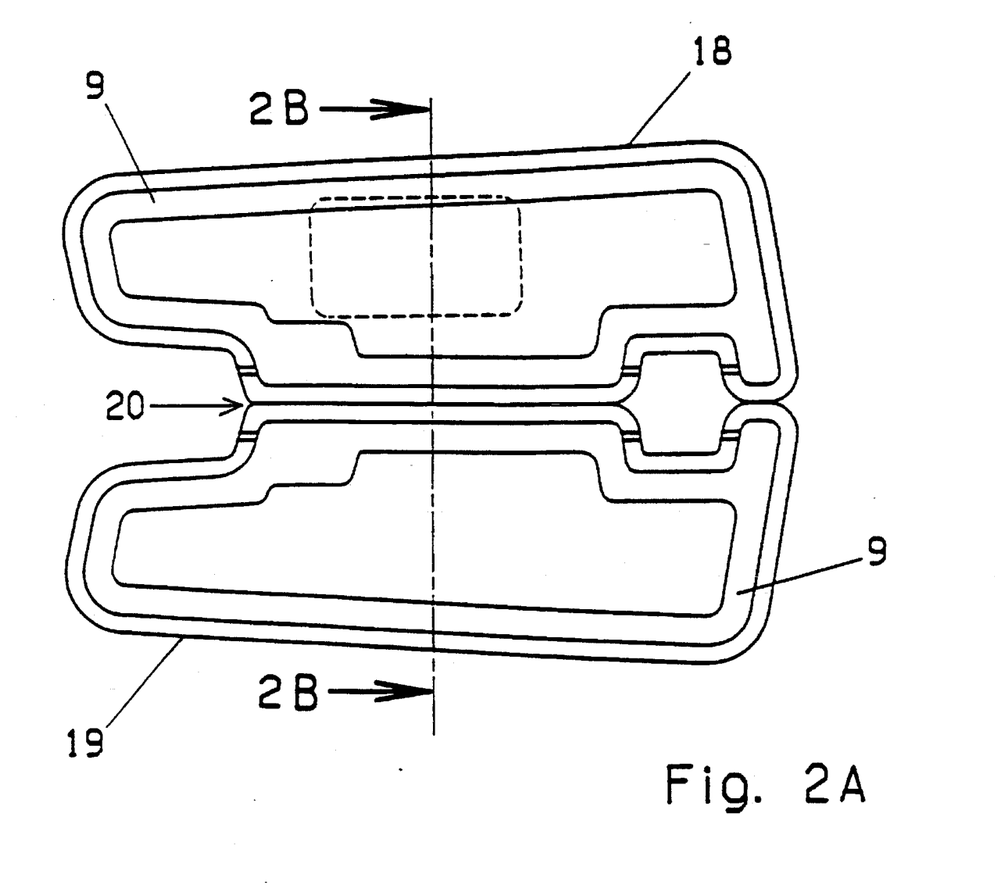
FIG. 2A shows the sun visor of FIG. 2 in one manufacturing stage.

The sun-visor body 1 of FIG. 2 corresponds in appearance to the sun-visor body 1 of FIG. 1. However, the sun-visor body 1 of FIG. 2 is formed of two half shells 18 and 19 advantageously connected to each other by a film hinge 20 (shown in FIG. 2E). FIG. 2A shows— as shown in FIG. 1A—a possible contour of the stiffening 9.

Figure 2B:
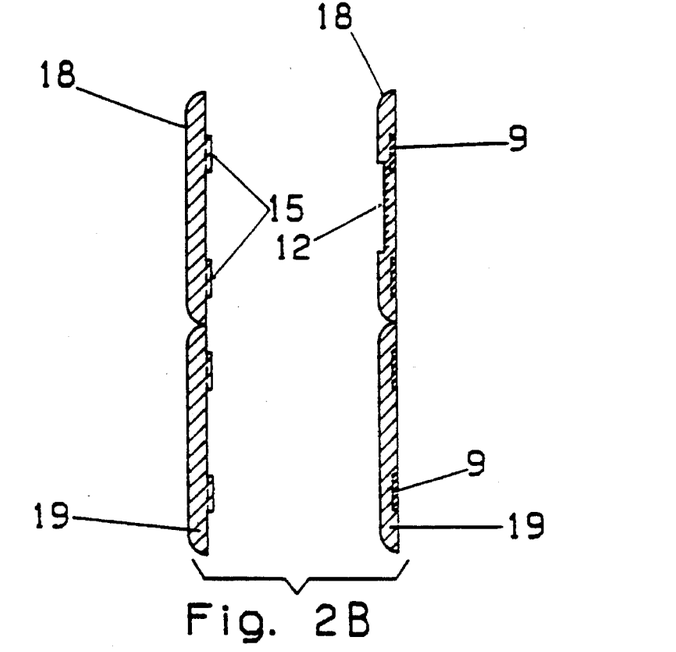
FIG. 2B is a section along the section line of FIG. 2A, shown in two manufacturing stages.

FIG. 2B shows that the half shells 18, 19 are provided on their respective surfaces, which come to rest against each other, with protruding ribs 15 which are forced by pressing into the plane of the corresponding surface to form stiffenings 9. By compressing, a stiffened recess 12 can also be provided in an opposite surface to receive a mirror (not shown).

Figure 2C:
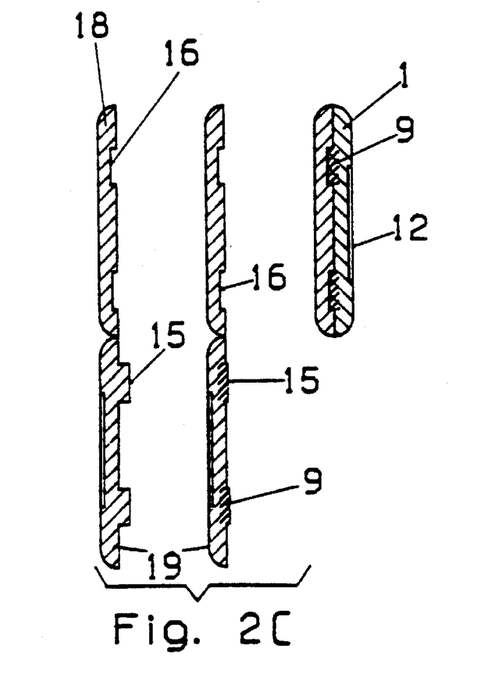
FIG. 2C shows three manufacturing stages of the sun visor of FIG. 2/FIG. 2A in a modified embodiment.

FIG. 2C shows an embodiment having an upper half shell 18, which is formed with a circumferential groove 16, and having a lower half shell 19 which has a circumferential rib 15. The height of the rib 15 is reduced by pressing and compacting and thereby adapted to the cross section of the opening of the groove 16 into which the rib 15 can then be pressed. The compacted region of the rib 15 forms the stiffening 9 present here again within the sun-visor body 1.

Figure 2D:
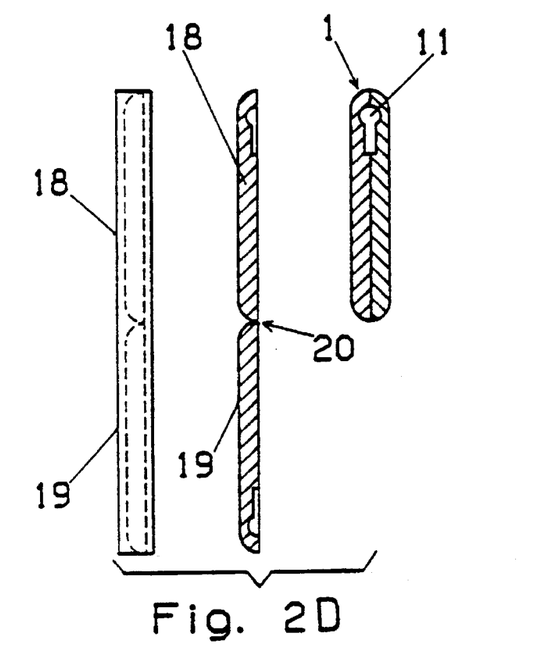
FIG. 2D is another alternative embodiment of the sun visor of FIG. 2

In FIG. 2D, two half shells 18, 19 are made oversize as shown and then pressed to the desired size with the simultaneous formation of a mounting recess 11.

Figure 2E:
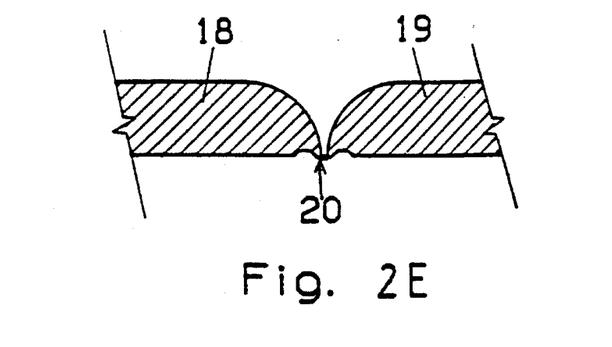
FIG. 2E shows a detail of the sun visor of FIG. 2.

FIG. 2E shows the development and attachment by compacting of the film hinge 20 to the sun-visor body halves 18, 19. The attachment is such that upon swinging together the halves 18, 19, the film hinge 20 forms a flush line with the outer contour of the sun-visor body 1.

Figure 3:
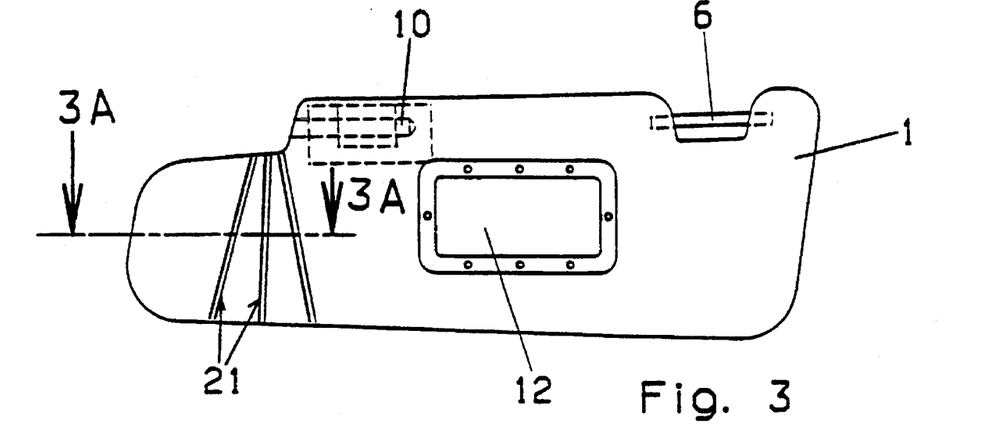
FIG. 3 is a plan view of a third sun visor.
Figure 3A:
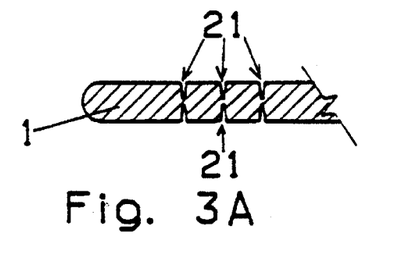
FIGS. 3A and 3B are each a section along the section line of FIG. 3.
Figure 3B:
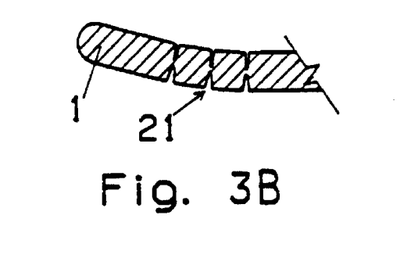

The sun-visor body 1 of FIG. 3 is similar to the embodiments described in connection with FIGS. 1 to 1.7. The main difference is that the sun-visor body 1 in FIG. 3.1 (as also shown in FIGS. 3A and 3B) has one or more depressions 21 which extend along the broad sides of the sun-visor body 1. These depressions or notches 21, which are also produced by compacting the material of the sun-visor body 1, have the effect of permitting the flat sun-visor body 1 to be arranged in and to adapt itself to any curvature of the roof in the region of the A-column of the vehicle in which the sun visor is provided.

Figure 4:
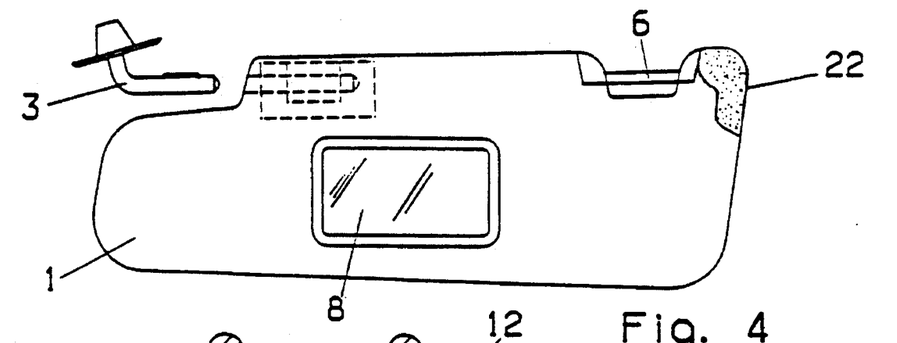
FIG. 4 is a plan view of a fourth embodiment.

FIG. 4 shows a sun-visor body 1 which is compacted on the outside over its entire surface with the simultaneous formation as covering of a surface structure 22. The surface structure 22 can be of any desired appearance, for instance with the character of a film, leather, pitted or wood.

Figure 4A:
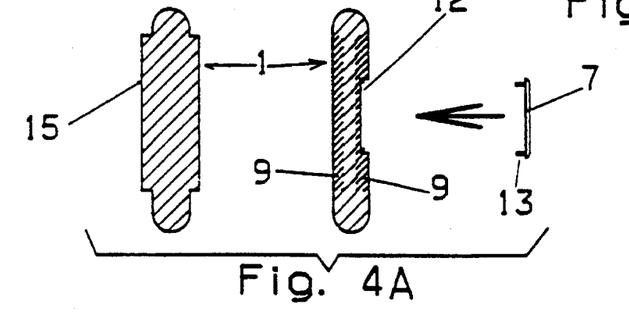
FIG. 4A shows manufacturing stages for the manufacture of the sun visor of FIG. 4.

The sun-visor body 1, shown in section on the left in FIG. 4A, is produced in oversize and then, as described previously, pressed together with the simultaneous introduction of a recess 12 to receive a mirror (not shown). Simultaneous with the pressing or compacting process, the surface structure 22 can also be produced if desired. The mirror frame 7 with mirror 8 is then pressed into the sun-visor body 1.

Figure 4B:
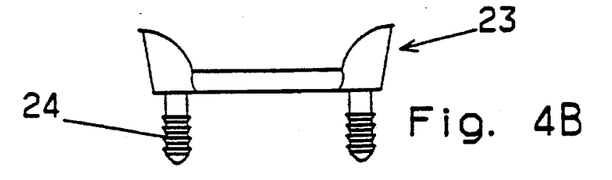
FIGS. 4C, 4D and 4B show in each case details of the sun visor of FIG. 4.
Figure 4C:
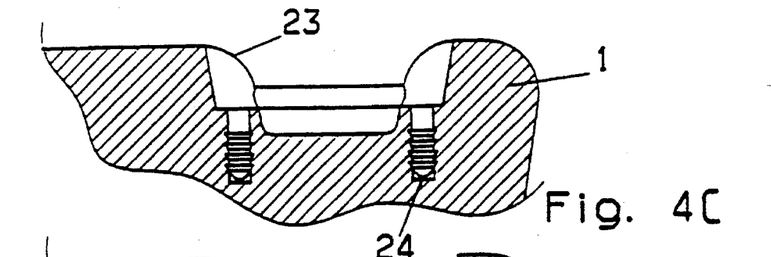
Figure 4D:
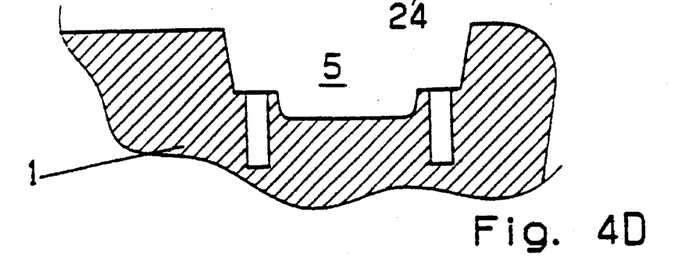

The outer support region on the sun-visor body 1 (shown in FIG. 4D) can be kept free for subsequent mounting of a sun-visor clamp 23. The clamp 23, which is of suitable size and shape (shown in FIG. 4B), is forced into the sun-visor body 1. FIG. 4C shows the finished condition wherein the clamp 23 is held in the material of the sun-visor body 1 by undercut-like depressions and elevations on the fastening pins 24, which force themselves into the foam.

Figure 5:
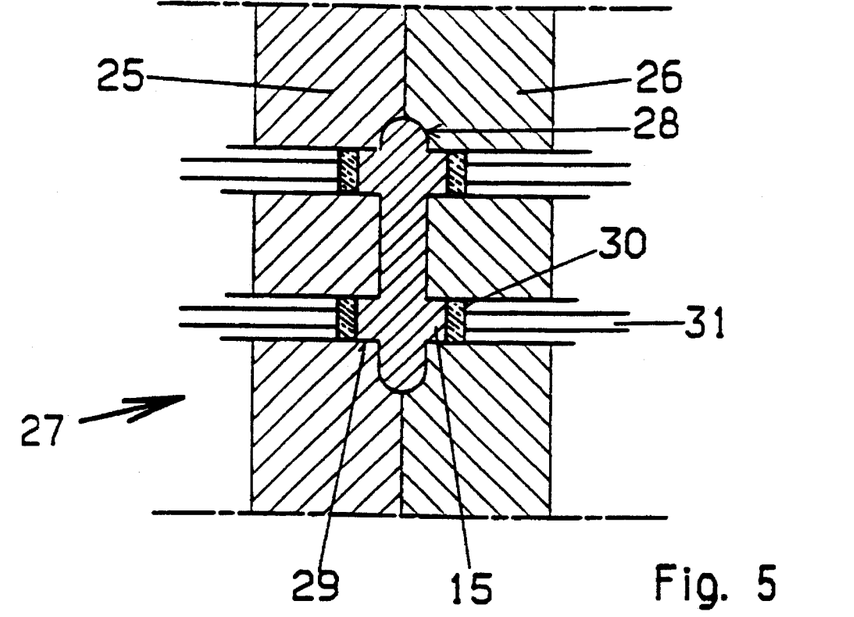
FIG. 5 is an apparatus for the manufacture of a sun-visor body.

FIG. 5 shows an apparatus for the manufacture of a sun-visor body 1. The apparatus comprises a mold 27 consisting of two halves 25, 26 and having a mold cavity 28 between the halves 25, 26. The mold cavity 28 has cavity extensions 29 which are also filled upon the foaming of the sun-visor body 1. The ribs 15 which are thereby developed on the sun-visor body 1 are forced into the plane of the sun-visor body 1 in order to produce stiffening zones 9 as a result of the compacting of the material. In order to achieve this, the mold 27 is provided with at least one pressure ram 30 which is in communication with the cavity 28 and, in particular, with the cavity extension 29. The pressure ram 30 is displaced by means of a rod 31, or the like, and operates so as to reduce the cross section of the sun-visor body 1 in predetermined regions. In the example shown in FIG. 5, the ribs 15 are pushed back by the pressure ram 30. The pressure ram 30 should preferably have heating and cooling means associated with it.

Figure 6:
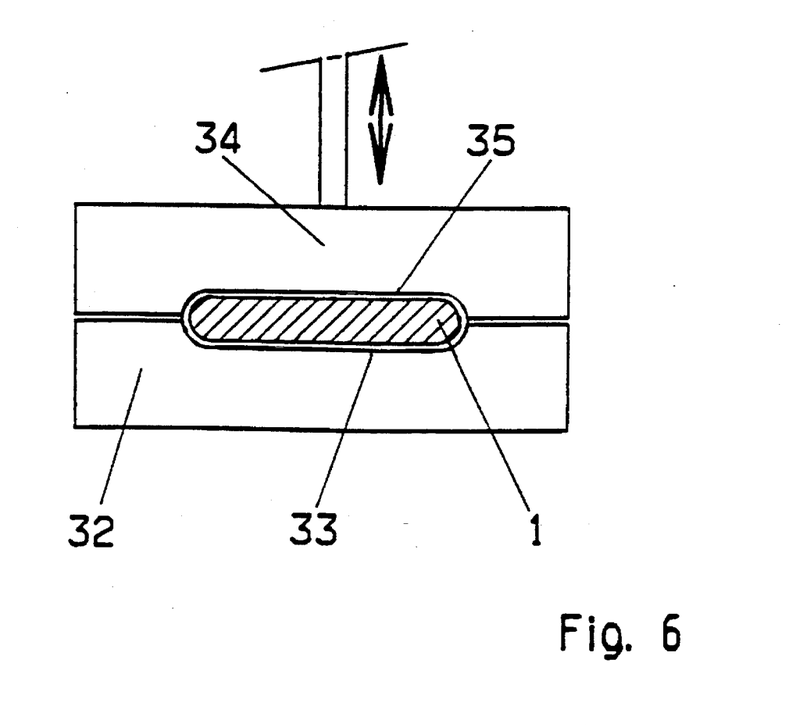
FIG. 6 shows an apparatus for the manufacture of a sun-visor covering.

FIG. 6 shows, in a simplified manner, an apparatus for the manufacture of a covering of a sun-visor body 1. The apparatus comprises a stationary lower mold 32 having a cavity 33 which receives the sun-visor body 1 up to approximately its longitudinal center plane. An embossing stamp 34 is provided which is movable against the lower mold 32. The embossing stamp 34 has a cavity 35 which surrounds the region of the sun-visor body 1 which protrudes out of the lower mold 32. The walls of the cavity 35 may be structured. The embossing stamp 34 also includes, in particular, means (not shown in detail) for the heating and plasticizing the surface of the sun-visor body 1 adjacent to it. The application of the embossed structure formed in the cavity 35 to at least partial regions of the sun-visor body 1 is effected with the use of heat and pressure.

In order to be able to provide in a single operation a sun-visor body 1 with a surface structure which surrounds it is advisable for the lower mold 32 also to be developed as an embossing stamp.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of manufacturing a sun visor comprising the steps of:
   (a) producing a sun-visor body by introducing a filling of polypropylene particles into a mold cavity of a mold, and heating the particles by the introduction of steam or hot air into the mold so that the particles soften, expand and weld to each other;
   (b) subjecting the sun-visor body obtained in step (a) to a compressing of the material by the action of a pressure generally perpendicular to a central plane of the sun-visor body to form at least one stiffening; and
   (c) providing the sun-visor body with a covering,
   wherein step (a) comprises producing a sun-visor body having two halves which are connected to each other by a film hinge; one half of the two halves being formed with at least one bead and the other half with at least one groove; and step (b) comprises subjecting only the bead to the action of pressure so as to reduce the height thereof with the formation of a stiffening; the method further comprising the step of removing the sun-visor body after cooling from the mold and introducing the bead into the groove by swinging the sun-visor body halves together.

2. A method according to claim 1, wherein step (b) comprises subjecting the sun-visor body to pressure and heat for compressing together the material of the sun-visor body to form the stiffening.

3. A method of manufacturing a sun visor comprising the steps of:
   (a) producing a sun-visor body by introducing a filling of polypropylene particles into a mold cavity of a mold, and heating the particles by the introduction of steam or hot air into the mold so that the particles soften, expand and weld to each other;
   (b) subjecting the sun-visor body obtained in step (a) to a compressing of the material by the action of a pressure generally perpendicular to a central plane of the sun-visor body to form at least one stiffening; and
   (c) providing the sun-visor body with a covering,
   wherein an indentation or cavity is formed on the surface of the sun-visor body in step (b), the indentation or cavity being filled with polypropylene particles and foamed.

4. A method according to claim 3, wherein step (b) comprises subjecting the sun-visor body to pressure and heat for compressing together the material of the sun-visor body to form the stiffening.

5. A method of manufacturing a sun visor comprising the steps of:
   (a) producing a sun-visor body by introducing a filling of polypropylene particles into a mold cavity of a mold, and heating the particles by the introduction of steam or hot air into the mold so that the particles soften, expand and weld to each other;
   (b) subjecting the sun-visor body obtained in step (a) to a compressing of the material by the action of a pressure generally perpendicular to a central plane of the sun-visor body to form at least one stiffening; and
   (c) providing the sun-visor body with a covering,
   wherein step (c) comprises plasticizing and embossing the surface layer of the sun-visor body to form a covering on the sun-visor body.

6. A method according to claim 5, wherein step (b) comprises subjecting the sun-visor body to pressure and heat for compressing together the material of the sun-visor body to form the stiffening.

* * * * *